United States Patent [19]

Burkit et al.

[11] Patent Number: 5,224,741
[45] Date of Patent: Jul. 6, 1993

[54] THRUST RESTRAINT FOR PIPE COUPLING SYSTEM

[75] Inventors: John W. Burkit, Kempton, Pa.; Milton P. Chernack, New York, N.Y.; James H. Sandler, Teaneck, N.J.

[73] Assignee: Valco Technology Inc., Hackensack, N.J. ; a part interest

[21] Appl. No.: 843,557

[22] Filed: Feb. 28, 1992

[51] Int. Cl.⁵ ............................................ F16L 21/02
[52] U.S. Cl. .................................. 285/114; 285/109; 285/371
[58] Field of Search ............... 285/109, 114, 370, 371, 285/397, 398, 420

[56] References Cited

U.S. PATENT DOCUMENTS

| | | | |
|---|---|---|---|
| 931,581 | 8/1909 | Doyle | 285/397 |
| 3,122,383 | 2/1964 | Hirsch | 285/397 |
| 3,141,687 | 7/1964 | Broberg et al. | 285/397 |
| 3,701,550 | 10/1972 | Jacobson | 285/397 |
| 3,712,649 | 1/1973 | Martin | 285/397 |
| 4,099,749 | 7/1978 | Van Vlift | 285/398 |
| 4,247,136 | 1/1981 | Fouss et al. | 285/397 |
| 4,927,189 | 12/1989 | Burkit . | |
| 4,997,212 | 3/1990 | Burkit . | |
| 5,042,633 | 3/1992 | Burkit | 285/109 |

FOREIGN PATENT DOCUMENTS

| | | | |
|---|---|---|---|
| 738934 | 10/1955 | United Kingdom | 285/371 |
| 974115 | 11/1964 | United Kingdom | 285/397 |

*Primary Examiner*—Eric K. Nicholson
*Attorney, Agent, or Firm*—William B. Noll

[57] ABSTRACT

This invention is directed to an internal expansion coupling system offering improved thrust restraint when joined to a pair of tubular members, preferably plastic, aligned in end-to-end relationship. The system comprises an elongated open ended tubular joint member formed from at least one, relatively rigid, rectangular sheet-like member, where each sheet-like member is defined by a pair of opposing sheet ends and a pair of opposing sheet sides, and a pair of sheet ends overlap such that the end portions thereof lie in close proximity to each other. The joint member is provided with a continuous circumferential gasket sealing sleeve formed of an elastomeric material and overlapping each said sheet side about the open end of the tubular joint member, where said gasket sealing sleeve is adapted to lie adjacent to and be compressed against the inside wall of said tubular member. Further, a member accessible externally thereof, as known in the art, is provided for expanding the tubular joint member. Finally, a plurality of thrust restraint members are provided and cooperate with the tubular joint member to prevent axial movement of the pair of tubular members joined thereto. Each thrust restraint member includes a plate having a plurality of downwardly extending sharp projections which override and grip the underlying end portions of the tubular members, and includes a member to apply compressive pressure between the plate and the tubular member.

10 Claims, 3 Drawing Sheets

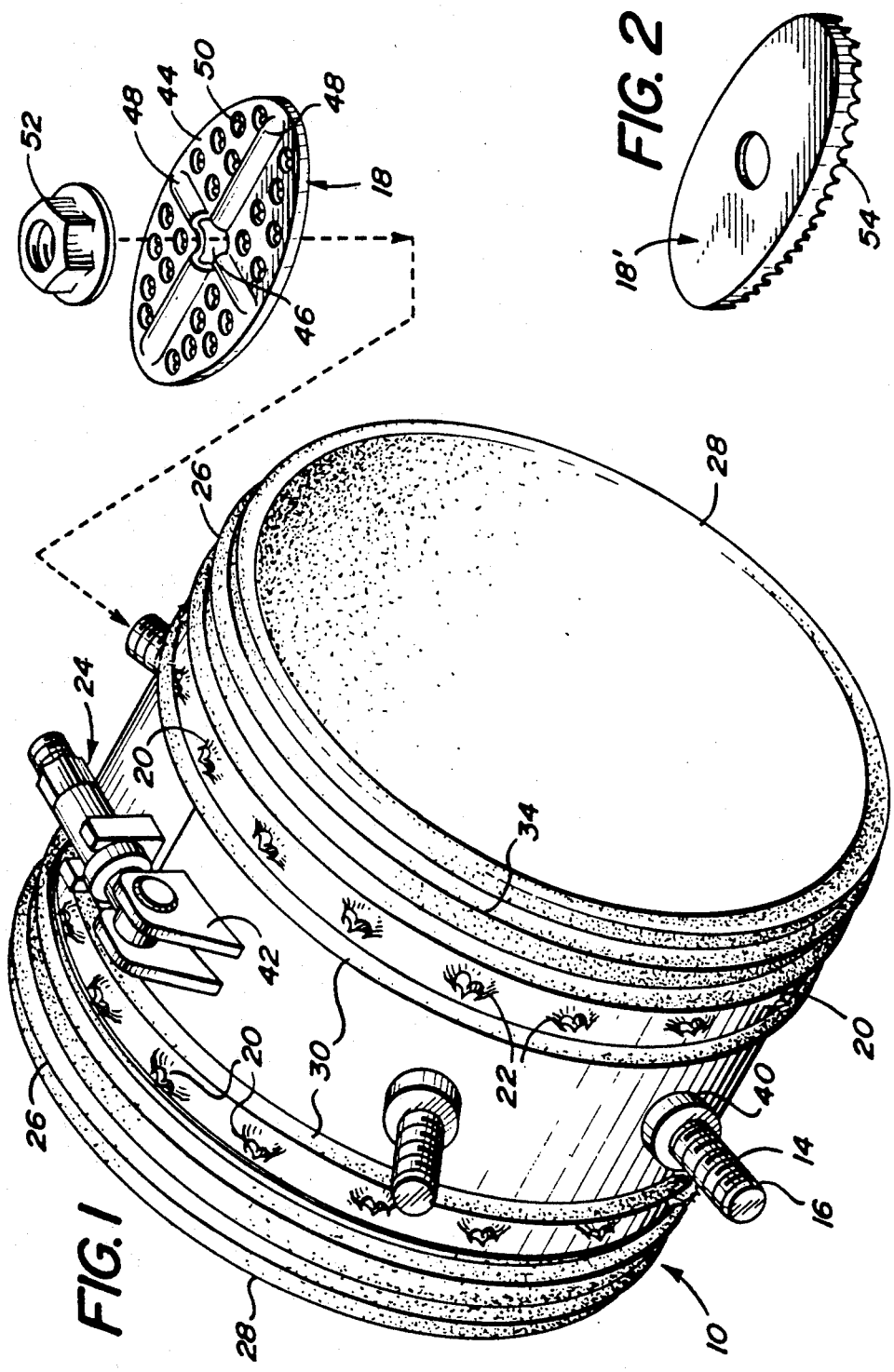

THRUST RESTRAINT FOR PIPE COUPLING SYSTEM

RELATED APPLICATION

This application represents an alternative approach to the pipe thrust restraint system taught in co-pending application Ser. No. 07/643,744, filed Jan. 22, 1991, and entitled "Pipe Coupler With Thrust Restraint" now U.S. Pat. No. 5,092,633.

BACKGROUND OF THE INVENTION

This invention is directed to the combination of a pair of aligned tubular members joined by an internal expansion coupling device that offers improved thrust restraint, particularly for plastic pipe, such as polyethylene, PVC, fiberglass and fiberglass reinforced polyester (FRP). Thrust restraint, as used herein, relates to the problem associated with the relative movement, i.e. axial separation, of coupled pipes or tubular members, and the loss of seal or effectiveness of the joint.

It was discovered by one of the inventors hereof, as exemplified by U.S. Pat. Nos. 4,927,189 and 4,997,212, that tight and effective seals can be achieved by the use of an internal expansion coupling device, as taught therein, especially in relatively static situations. Such device comprises an elongated open ended tubular joint member formed of a relatively rigid sheet-like member, where the ends are turned upon each other in overlapping relationship. A continuous sleeve, formed of an elastomeric material, is provided to overlap the sheet side, where the sleeve, about the circumference thereof, may be provided with at least one continuous upstanding rib which is adapted to lie adjacent to and be compressed against the inside wall of a tubular member. Finally, means for expanding the sheet-like member is provided, whereby the sheet ends move circumferentially towards one another urging the elastomeric sleeve and rib against the inside wall of a tubular member. Such a device has proved successful in effecting a tight seal between the tubular members.

However, there is a strong need, particularly in the plastic transmission line industry, for an effective coupling system that offers the advantages of ease of assembly and disassembly, tight seal to the flow medium, and thrust restraint. By the nature of the product, particularly such plastics as polyethylene, PVC, fiberglass and FRP, it has been necessary to follow a very labor intensive and time consuming practice to join plastic pipe. A typical joint for plastic pipe, laid end-to-end, is to apply an external sleeve or fitting socket to the pipe ends, where the sleeve is provided with an internal continuous shoulder or pipe stop for the pipes inserted therein. Since no mechanical devices are used, the sealing thereof has to rely on adhesives. For instance, using PVC as an exemplary pipe material, the surface end portions of the pipes are subjected to a cleaner-primer, the purpose of which is to soften and dissolve the surface to be joined to the sleeve, followed by the application thereto of a solvent cement. Unfortunately, there are numerous precautions or practices which must be followed.

Pipe size, particularly large diameter pipe, is a major factor. For example, the basic solvent cement instructions apply to all sizes of pipe, but when making joints 4" and above, the use of two men to apply the solvent cement simultaneously to pipe and fitting is recommended. Additional men should also be in a position to help "push" the pipe into the fitting socket while the cemented surfaces are still wet and ready for insertion. Thus, labor costs have a significant impact on this traditional manner of joining plastic pipe. There are additional concerns. Alignment of large diameter pipe and fittings is much more critical than when working with small diameter pipe. As the pipe diameters increase, the range of tolerances also increases, which can result in "out of round" and "gap" conditions. Speed in making the joint and applications of heavy coats of solvent cement in these cases is important.

Temperature and atmospheric conditions are further factors to be considered. In cold weather conditions, the typical primers take considerably longer time to penetrate the surface of the plastic. Further, at cold temperatures, it is important to keep the primers and cement, and even the fittings warm. There are just as many problems or concerns under warm weather conditions.

To further complicate this cumbersome prior art practice, cure times will vary with pipe sizes, temperature and humidity conditions. As a practical matter, a complex table of cure times is required for any pipe laying operation. For instance, the cure time for 20" pipe is dry summer-like weather in about 36 hours. The same pipe, under humid but freezing conditions, would require a cure time of from 20 to 24 days, a significant difference. After all this time and effort, and only then, may the coupled pipes be pressure tested. The results at best are good, which would certainly suggest some failures.

The present invention avoids such delays and labor costs with a coupling system that is effective, easily assembled and disassembled, and one that may be used or tested immediately. The coupling system of this invention will become clearer in the description which follows.

SUMMARY OF THE INVENTION

This invention relates to an internal expansion coupling system offering improved thrust restraint when joined to a pair of aligned tubular members, preferably formed of plastic, such as polyethylene, PVC, fiberglass and FRP. The system comprises a tubular joint member of the type found in U.S. Pat. No. 4,927,189, which has been modified by the inclusion of a thrust restraint member cooperating with said tubular joint member to prevent axial movement of the tubular members joined to said tubular joint member, where said thrust restraint member includes a plate having a plurality of downwardly extending sharp extensions which override and compressively grip the underlying tubular members. Optionally the tubular joint member may comprise a pair of arcuate shaped sheet-like members.

BRIEF DESCRIPTION OF DRAWINGS

FIG. 1 is an exploded perspective view of a preferred embodiment of the coupling system according to this invention.

FIG. 2 is a perspective view showing an alternate embodiment for an external thrust restraint member according to this invention.

DETAILED DESCRIPTION OF PREFERRED EMBODIMENT

Figure 3:
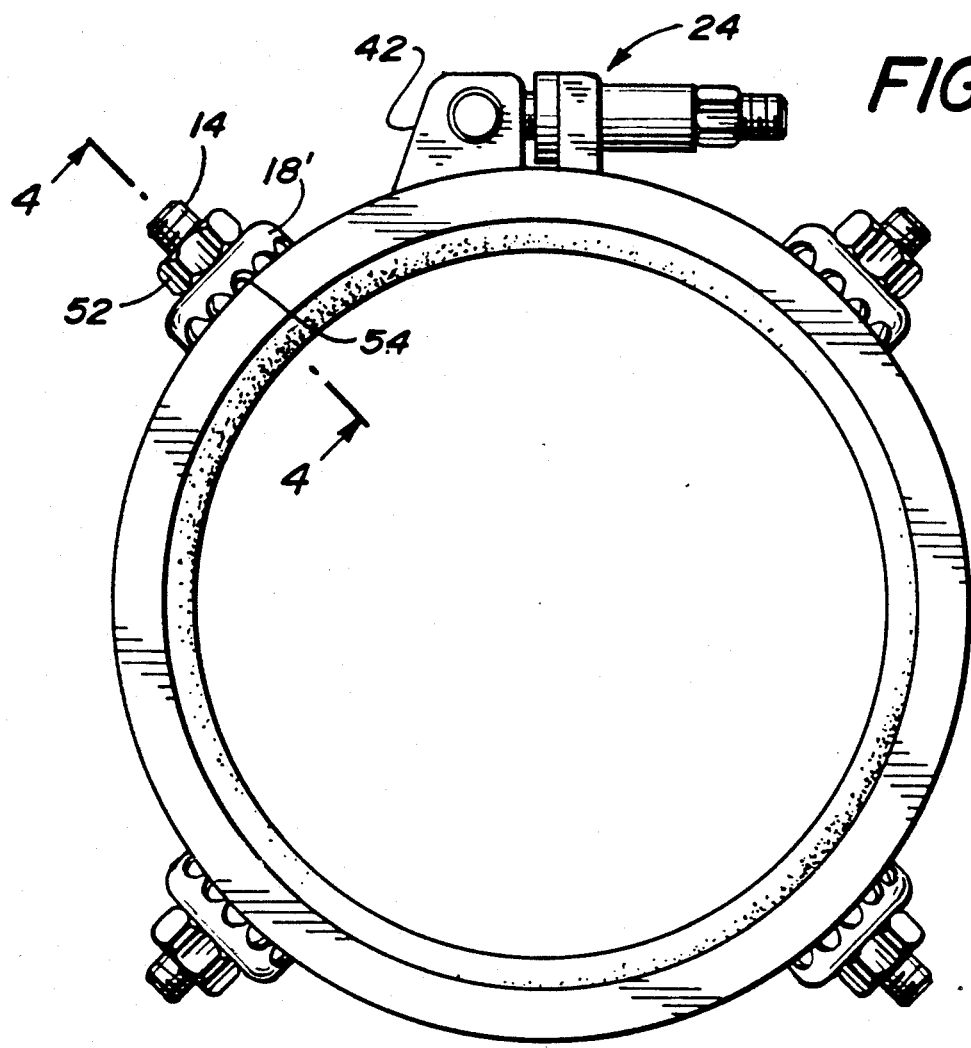
FIG. 3 is an end view of a coupling system, as coupled to a tubular member, illustrating an externally applied thrust restraint member according to this invention.

The present invention, as illustrated by the preferred embodiment of FIG. 1, comprises an internal expansion pipe coupling device to provide thrust restraint between a pair of tubular members connected thereto, preferably where such members are selected from the group of plastics, such as PVC, fiberglass, FRP and polyethylene.

The coupling device 10, except as modified herein, is described in U.S. Pat. Nos. 4,927,189 and 4,997,212, by one of the inventors hereof. The preferred coupling device 10 of this invention comprises an open-ended tubular member or expanding sleeve 12 formed from a relatively rigid sheet-like material, such as plastic, composite material, or metal, i.e. stainless or coated plain carbon steel, wrapped into a cylindrical configuration where the sheet ends overlap and lie contiguous with one another. As will be described later, an alternate embodiment, utilizing a pair of arcuate sheet-like members may be joined to form the expanding sleeve 12. The preferred expanding sleeve 12 is modified by the addition of a plurality of spaced-apart stud elements 14 projecting outwardly in a direction normal to the surface thereof, where such stud elements may be welded to the sleeve 12, or by the use of a threaded bolt passing up through the sleeve. In each case, such elements 14 are preferably threaded 16 to receive a thrust restraint member 18 and complementary nut 52 and washer 53 to compressively secure the restraint member 18, as more fully explained hereinafter. Additionally, the surface of sleeve 12 may be provided with an annular row of outwardly directed serrations 20, where there is one such row per tubular member to be joined thereto. In the case of a metal sleeve 12, such serrations or projections may be formed by stamping, punching or piercing holes in the metal sleeve, or a metal sheet band spot welded to the sleeve, where the operation results in deforming the metal and exposing sharp or jagged edges 22. In the case of a plastic sleeve, the steel projections may be molded into the sheet during the manufacturing process. In any case, as will be demonstrated hereafter, such serrations or projections are adapted to dig into the inner surface of the tubular members as the coupling device is expanded. Such expansion is achieved by an expansion mechanism 24 as described in U.S. Pat. Nos. 4,927,189 and 4,997,212, joined to the respective sheet edges, where such sheet edges in overlapping relationship move circumferentially toward one another to bring the coupling device into a tight, sealing engagement with the tubular members.

The effective seal achieved by the coupling device 10 of this invention is found in the use of a continuous gasket sleeve 26 about the open ends 28 of coupling device 10, and by the addition of an O-ring type gasket 30 displaced therefrom on the inside of the row of serrations 20. This arrangement effectively isolates the serrations 20, and thereby eliminates any leakage of flowing medium which may attempt to pass through such serrations.

Figure 4:
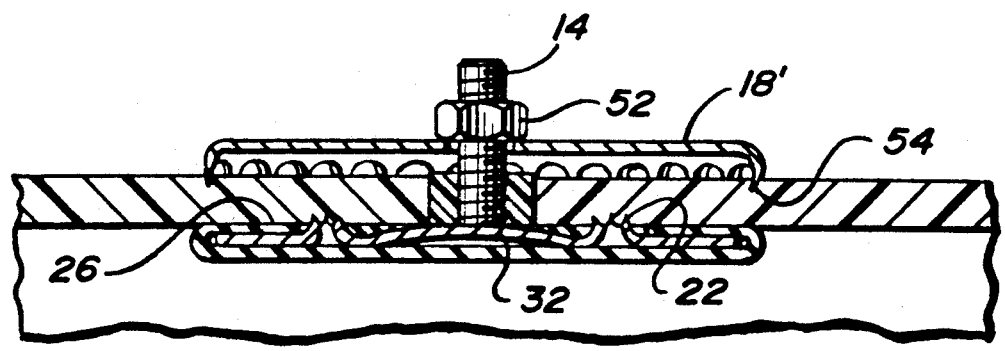
FIG. 4 is a partial sectional view of the coupled tubular member of FIG. 3, taken along line 4—4 of FIG. 3.

While each such outer gasket sleeve 26 wraps around its corresponding end 28, such that the cross-section thereof is U-shaped, it is preferable to connect the inner arms, as shown by reference numeral 32 in FIG. 4, to essentially lie contiguous with the inner wall of tubular member 12. The sleeve is formed of an elastomeric material, such as high quality rubber, or the like. Further, the sleeve, particularly that inner portion identified by reference numeral 32, may be provided with circumferentially disposed high strength wires within the sleeve to provide hoop support or strength. The preferred manner would be to place such wires in the sleeve during the molding operation. The outer portion is provided along the surface thereof with rib 34, or scalloped, such as by plural ribs. Preferably, such ribs 34 are pointed, or knife-edged, so as to readily yield and seal upon expansion of the coupling device 12. As by procedures known in the art, the gasket sleeve 30 may be extruded into an endless length, i.e. continuous, and cut to discrete lengths for use herein. The ends thereof may then be vulcanized or joined by a suitable adhesive to form a continuous cylindrical shape. Additionally, it is contemplated by this invention that a bond may be provided between the inner wall adjoining the coupling sleeve 12, where bonding thereof may be effected by vulcanization.

Returning now to FIGS. 1 and 2, the preferred manner of securing the plural, spaced-apart stud members 14, centrally about the sleeve 12, is to secure same by welding. At the base thereof, a collar 40 is provided. The diameter of collar 40 is essentially equal to the width of the pivot supports 42 of the sleeve expanding means 24, to provide a plurality of upstanding stops for the aligned tubular members to be joined to the coupling member.

A first thrust restraint member 18 is illustrated in FIG. 1 in a position exploded from the stud element 14. The thrust restraint member 18 comprises a metal plate 44, having a central opening 46 for mounting on stud element 14. For strengthening purposes, the plate 44 may be provided with plural ribs 48. Additionally, the plate 44 is provided with a plurality of downward projecting serrations 50, produced such as by punching holes in the plate 44, to provide a gripping surface to contact and engage a pair of tubular members joined to the coupling device. The plate 44 is preferably curved about its longitudinal dimension in order to lie contiguous with said tubular members. In order to compress the plate 44 against such tubular members, threaded nuts 52 and optional washer 53 are provided for engagement with the several stud elements 14.

FIG. 2 illustrates an alternate design for a thrust restraint member 18'. Such member may be stamped out formed from a heavy gauge metal, such as steel, to provide plural, peripheral teeth 54. FIG. 3 is an end view of the coupling device hereof, illustrating the manner by which thrust restraint member 18' is applied to the coupling device. FIG. 4 is a side sectional view showing how the thrust restraint member 18', or any related thrust restraint member, cooperates with the sleeve member 12 to effect a tight seal and restraint against the axial movement of a pair of tubular members from the sleeve. That is, as the nut 52 is tightened down the shank of stud element 14, a simultaneous action takes place. The sleeve 12 is pulled toward the tubular members causing the serrations 22 to dig into such members. Concurrently, the teeth 54 are driven toward and into the outer surface of such tubular members.

Figure 5:
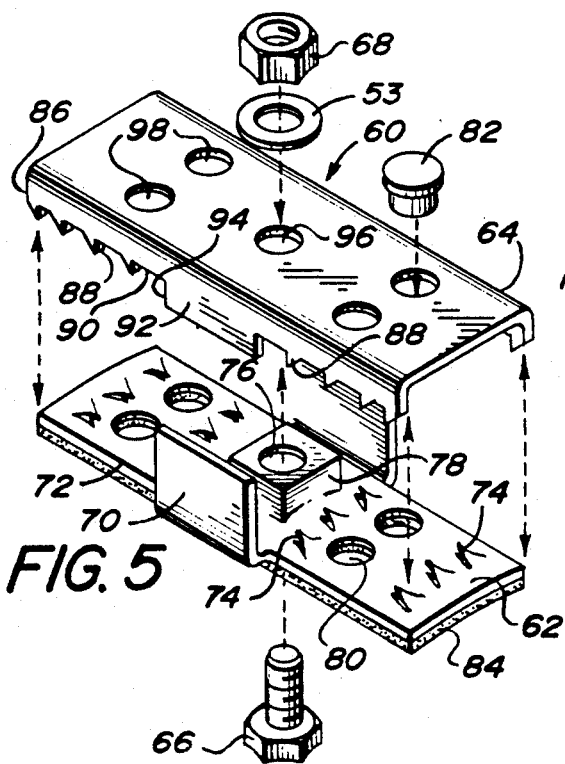
FIG. 5 is an exploded perspective view of a further alternate embodiment for an external thrust restraint member according to this invention.

FIG. 5 is a perspective view of a further embodiment of a thrust restraint member 60 according to this invention. The thrust restraint member 60 comprises a pair of stamped and formed metal plates 62,64 compressed against a pair of aligned tubular members by the threaded bolt 66 and nut 68, as hereinafter explained. The plate 62, longitudinally shaped to lie contiguous with the sleeve 12, includes a pair of upstanding pipe stops 70, one on each side 72, and a plurality of upstanding barbs 74 for contact and engagement with the inner surface of the pipe or tubular members to be joined in aligned relationship. Additionally, the plate 62 includes a central opening 76 within a raised boss 78 into which bolt 66 is received and locked against rotation. A plurality of holes 80 may be provided to receive a like plurality of press fit pins 82, which, as explained later, provide additional thrust restraint to the coupling system. Finally, a double-sided tape 84 may be provided on the underside of plate 62 for contact with the underlying sleeve. The tape 84 is ideal for in-field installation where temporary positioning of the thrust restraint member 60 is needed.

The upper stamped and formed plate 64 is essentially a channel shaped member having a pair of side walls 86 with plural teeth 88 along the edge 90. Intermediate the sets of teeth, each side wall 86 includes an extension 92 which functions as a pipe stop 94 when joined by a pair of aligned tubular members. The upper plate 64 is further characterized by a central opening 96, aligned with opening 76 in lower plate 62, for receiving bolt 66. Finally, additionally holes 98 may be provided in plate 64 to receive thrust restraint pins 82. The latter pins 82 may be provided to give additional thrust restraint to the coupling system. The pins, for example, would be applied in the field by drilling the holes 98,80, as required, after the coupling is installed. From tests it has been demonstrated that the number of thrust restraint members 60 used will depend upon the pipe material with which it is used, and the size of pressure requirements of the pipe. For example, in polyethylene pipe without the pins 82 in place, the coupling system can support between 600 and 700 pounds per thrust restraint member 60. With the pins 82 in place, there is an increase that approaches about 1000 pounds per thrust restraint member. With steel pipe, the use of the pins will improve the performance of each thrust restraint member to over 3000 pounds.

Figure 6:
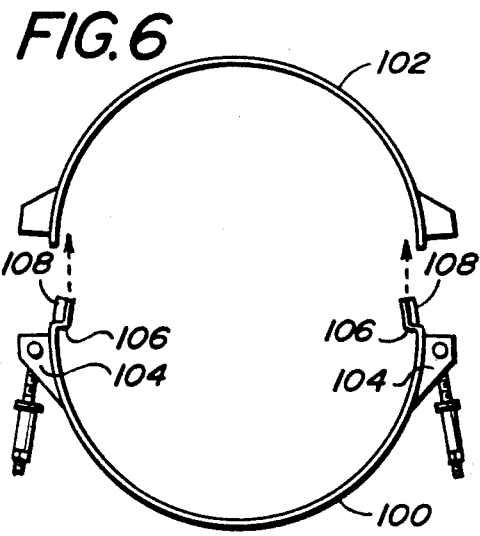
FIG. 6 is an end view of a pair of arcuate sheet-like members forming the tubular joint member for joining large diameter pipe according to this invention.
Figure 7:
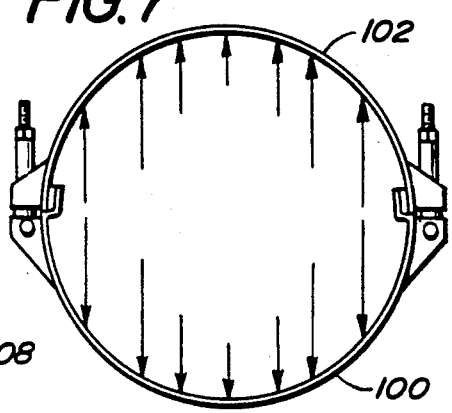
FIG. 7 is an end view of the assembled tubular joint member of FIG. 6.
Figure 9:
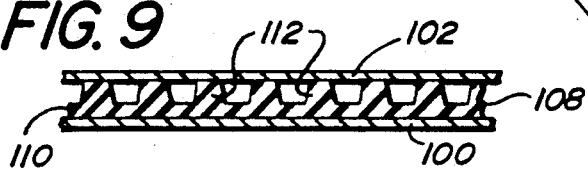
FIG. 9 is a sectional view taken along line 9—9 showing a waffle-shaped gasket between the parallel and overlapping sheet-like members.
Figure 8:
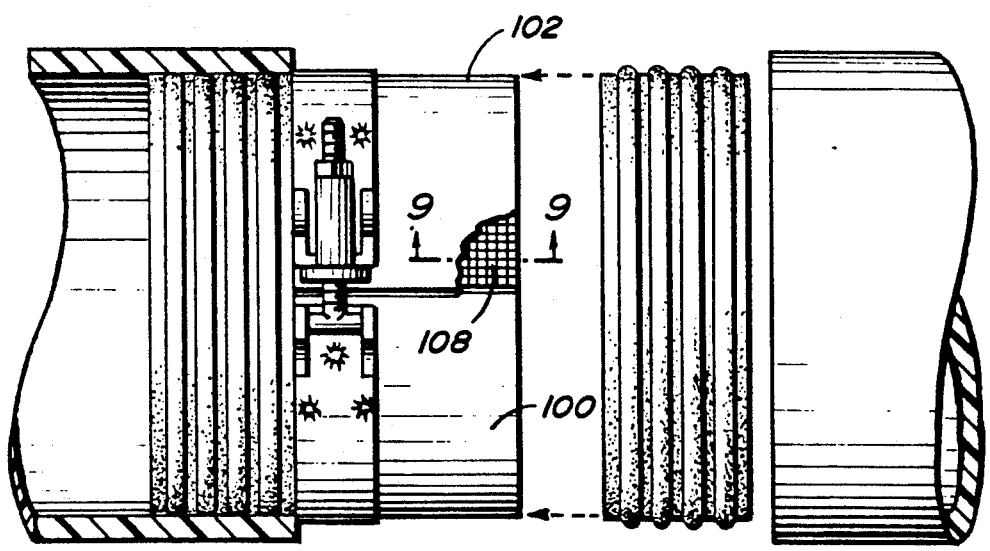
FIG. 8 is a plan view, with a portion of the sheet-like member removed, showing a preferred elastomeric sealing gasket for insertion between overlapping sheet-like members.

While the coupling system of this invention is intended to cover a range of sizes for metal and plastic pipe, FIGS. 6 and 7 illustrate the use of a pair of arcuate shaped sheet-like members 100,102 which may be joined in overlapping relationship for large diameter pipe, i.e. 14" and larger. For such an arrangement a pair of expansion mechanisms 104 may be used. It will be noted that with this embodiment, sheet 100 has been provided with a stepped shoulder 106 to receive therein an essentially flat elastomeric sealing member 108, where a cross section thereof is illustrated in FIG. 9. A preferred sealing member 108 is one which may be characterized as waffle configured. That is, the sealing member 108 includes a continuous portion 110 having a plurality of spaced-apart, individual portions 112 projecting therefrom. By this arrangement, the individual portions 112 may be readily compressed to effect a tight seal between the sheets 100,102, see FIG. 8.

We claim:

1. An internal expansion coupling system offering improved thrust restraint when joined to a pair of tubular members aligned in end-to-end relationship, said system comprising:
    (a) an elongated open ended tubular joint member formed from at least one, relatively rigid, rectangular sheet-like member, where each said sheet-like member is defined by a pair of opposing sheet ends and a pair of opposing sheet sides, and a pair of sheet ends overlap such that the end portions thereof lie in close proximity to each other;
    (b) a continuous circumferential gasket sealing sleeve formed of an elastomeric material and overlapping each said sheet side about each open end of said tubular joint member, where said gasket sealing sleeve is adapted to lie adjacent to and be compressed against the inside wall of said tubular member;
    (c) means accessible externally thereof for expanding said sheet-like members whereby said overlapping sheet ends move circumferentially towards one another and said expanding sheet-like members uniformly urge said elastomeric gasket sealing sleeve against the inside walls of said tubular member thereabout; and
    (d) a plurality of thrust restraint members cooperating with said tubular joint member to prevent axial movement of said pair of tubular members joined thereto, where each said thrust restraint member includes a plate having a plurality of downwardly extending sharp projections which override and grip the underlying end portions of said tubular members, and means to apply compressive pressure between said plate and said tubular members.

2. The thrust restraint and coupling system according to claim 1 wherein said last named means includes a plurality of threaded studs projecting from said tubular joint member, and said thrust restraint members include a central opening to engage a separate stud, and a threaded nut to threadedly engage said stud.

3. The thrust restraint and coupling system according to claim 2 wherein said thrust restraint member comprises a planar metal stamping formed with plural serrations along a surface thereof in contact with said end portions.

4. The thrust restraint and coupling system according to claim 1 wherein said thrust restraint member includes a second stamped and formed plate to underlie and contact the inside surface of said aligned tubular members, and a threaded member between the respective plates, and means to apply a compressive pressure therebetween.

5. The thrust restraint and coupling system according to claim 4 where each said plate includes plural serrations to respectively contact and engage the outer and inner surfaces of the tubular members sandwiched therebetween.

6. The thrust restraint and coupling system according to claim 1 wherein said tubular joint member comprises a pair of arcuate shaped sheet-like members, the respective ends of which are joined in overlapping relationship to form a continuous circle, and that elastomeric sealing members are provided between said overlapping ends.

7. The thrust restraint and coupling system according to claim 6 wherein said elastomeric sealing member comprises a flat continuous member having a plurality of individual raised projections where said projections are adapted to be compressed against one of said arcuate shaped sheet-like members.

8. The thrust restraint and coupling system according to claim 4 wherein said thrust restraint plates include at least one pair of aligned holes, aligned with a hole in the end of the tubular joint member wall to receive a thrust restraint pin therethrough.

9. The thrust restraint and coupling system according to claim 1 wherein said tubular joint member includes a pair of outwardly projecting serrations annularly arranged thereabout.

10. The thrust restraint and coupling system according to claim 9 wherein said serrations are adjacent said gasket sealing sleeve, and that an elastomeric O-ring is provided adjacent to and on the opposite side of the serrations.

* * * * *